Patented July 21, 1931

1,815,276

UNITED STATES PATENT OFFICE

CHARLES SCHWIEGER, DECEASED, LATE OF LAGE, GERMANY, BY ALFRED SCHWIEGER, ADMINISTRATOR, OF SAN FRANCISCO, CALIFORNIA, ASSIGNOR, BY MESNE ASSIGNMENTS, TO SCHWIEGER CHEMICAL CO., A CORPORATION OF DELAWARE

PROCESS OF MANUFACTURING SUGAR

No Drawing. Application filed September 6, 1927, Serial No. 217,884. Renewed October 7, 1930.

The present invention relates to improvements in the manufacture and manufacturing of sugar and its principal object is to provide an improved process which allows the amount of high grade sugar gained from a given quantity of raw material to be increased at the expense of the residue of molasses. It has been found that not all impurities in the sugar juices are equally effective in forming molasses, but principally the organic acid lime salts render the separation of the sugar difficult. It has been discovered after many years of experimenting that these organic acid lime salts which are the principal enemies of the production of sugar may be separated through treatment with ammonium carbonate. Many other chemicals have been used for this purpose, but they have never overcome the real difficulties in the production of sugar as economically and as successfully.

It has been further found that the results thus far obtained in the manufacturing of sugar may be considerably enhanced by extending the time periods during which the sugar juices are submitted to the action of certain chemicals beyond what has been considered thus far best adapted.

It has been further found that the run-off remaining after a complete process of manufacturing sugar has been carried out may be added and re-introduced into the sugar juice of the next process at an early stage thereof for the purpose of further treating the said run-off, whereby the final amount of molasses which cannot be further utilized for producing sugar on a commercial basis is reduced to a minimum.

The preferred method of carrying out this invention will be described in the following specification, it being understood that various changes or modifications may be made without departing from the spirit of the invention, and more particularly that certain changes may be made in the stages at which this chemical treatment takes place, as well as in the periods of time employed.

For a description of the preferred method of carrying out this invention it will be assumed that the factory in which the process is carried out has a capacity of eight hundred tons per twenty-four hours. Particular reference will be had to the manufacture of beet sugar, although the principles of the invention may be applied to kindred manufactures such as cane sugar.

The raw sugar juice is first heated to a temperature of seventy-five to eighty degrees centigrade, and subjected to the well-known process of lime separation in which it is subjected to the action of calcium oxide and agitated for a period of preferably five to ten minutes. After expiration of this period add run-off left over from a previous proceeding, preferably in the proportion of about seventy-five cubic feet of molasses to five hundred cubic feet of sugar juice. Also add to this mass about fifteen hundred grams of ammonium carbonate $(NH_4)_2CO_3$. This chemical is allowed to act on the juice for a period of approximately twenty minutes. Thereafter the juice is subjected in the ordinary and well-known manner to a first process of carbonation, whereby calcium carbonate and most of the impurities in the juice are precipitated. The juice is then filtered out and may in the customary manner be subjected to a second process of carbonation and filtration as a result of which a thin juice of about twelve to sixteen Brix viscosity is obtained.

This thin juice is preferably again subjected to the action of ammonium carbonate $(NH_4)_2CO_3$, approximately in the proportion of five hundred cubic feet of juice to five hundred to fifteen hundred grams of ammonium carbonate, while agitating the juice. After this chemical has acted for twenty minutes the juice is again filtered and may now be subjected to further treatment in the customary manner by evaporation and vacuum treatment for producing the mass known as massecuite. The latter mass is passed through centrifugal separators whereby crystallized sugar is separated from a residue or run-off which latter by-product is used over again in the next proceeding in the manner previously described by adding the same to the raw juices after the lime separation.

The latter feature renders unnecessary the repeated and expensive treatment of the run-off and the entire process is characterized by smooth and undisturbed operation in which each step performs its function without the presence of disturbing factors.

It should be understood that the second treatment with ammonium carbonate is not absolutely necessary but is productive of better results. It should also be understood that while the preferred time period for the reaction is twenty minutes, this time period may under certain circumstances be lessened or increased, the essential feature being that the time period should be extended, under given conditions, beyond that which has thus far been considered best under the same conditions. It is further to be noted that the addition of the run-off from a previous batch serves merely the purpose of securing the sugar from the said run-off in an economical manner and is not intended to affect the process as to the batch under treatment so that a new batch may be treated in the manner above described without the addition of the run-off from a previous batch.

What is claimed is:

1. In the process of manufacturing sugar, the step of reintroducing run-off left over from a previous sugar manufacturing process into the raw juice after the latter has been treated with calcium oxide, for further treatment with said raw juice, and in subjecting the mass thus obtained to the action of ammonium carbonate.

2. In the process of manufacturing sugar, the step of reintroducing run-off left over from a previous sugar manufacturing process into the raw juice after the latter has been treated with calcium oxide, for further treatment with said raw juice, and in subjecting the mass thus obtained to the action of ammonium carbonate for a period ranging from five to twenty-five minutes.

3. In the process of manufacturing sugar, the steps of subjecting raw juice to the process of lime separation, causing a quantity of ammonium carbonate to act on the juice and subjecting the resulting juice to a process of carbonation.

4. In the process of manufacturing sugar, the steps of subjecting raw juice to the process of lime separation, causing a quantity of ammonium carbonate to act on the juice for a period of approximately twenty minutes and subjecting the resulting juice to a process of carbonation.

5. In the process of manufacturing sugar, the steps of subjecting raw juice to the process of lime separation, causing a quantity of ammonium carbonate to act on the juice, substantially in the proportion of fifteen hundred grams of ammonium carbonate to 500 cubic feet of sugar juice and subjecting the resulting juice to a process of carbonation.

6. In the process of manufacturing sugar, the step of treating sugar juice with ammonium carbonate in addition to the carbonation process.

7. In the process of manufacturing sugar, the step of subjecting sugar juice to treatment with lime and ammonium carbonate.

8. In the process of manufacturing sugar, the step of subjecting sugar juice to treatment with lime and ammonium carbonate for a period of approximately twenty minutes.

9. In the process of manufacturing sugar, the step of subjecting sugar juice to treatment with lime, and ammonium carbonate in the presence of run-off left over from a previous sugar manufacturing process.

10. In the process of manufacturing sugar, the step of re-introducing run-off left over from a previous sugar manufacturing process into the raw juice after the latter has been treated with lime, for further treatment with said juice.

11. In the process of manufacturing sugar, the successive steps of subjecting the raw juice to lime separation, carbonation, filtration and a second carbonation.

12. In the process of manufacturing sugar, the successive steps of subjecting the raw juice to lime separation, carbonation, filtration, a second carbonation and to treatment with ammonium carbonate.

ALFRED SCHWIEGER,
*Administrator of the Estate of Charles Schwieger, Deceased.*